United States Patent [19]
Hayashi

[11] Patent Number: 5,305,382
[45] Date of Patent: Apr. 19, 1994

[54] SATELLITE BROADCAST RECEIVER
[75] Inventor: Toshihide Hayashi, Kanagawa, Japan
[73] Assignee: Sony Corporation, Tokyo, Japan
[21] Appl. No.: 785,760
[22] Filed: Oct. 31, 1991
[30] Foreign Application Priority Data
Nov. 9, 1990 [JP] Japan .................. 2-302606
[51] Int. Cl.⁵ .............................. H04L 9/00
[52] U.S. Cl. ............................ 380/23; 380/2; 380/9; 380/10; 380/49; 455/3.2; 348/725
[58] Field of Search .............. 380/2, 9, 10, 19, 23, 380/49; 358/188; 455/3.2

[56] References Cited
U.S. PATENT DOCUMENTS 3,781,472 12/1973 Goode et al. ..................... 380/2
4,368,357 1/1983 Gurak ............................ 380/2
4,635,223 1/1987 Boone et al. ................... 380/2 X
5,077,791 12/1991 Salihi ............................ 380/23

Primary Examiner—Bernarr E. Gregory
Attorney, Agent, or Firm—Lewis H. Eslinger; Jay H. Maioli

[57] ABSTRACT

A satellite broadcast receiver comprise a demodulator for demodulating received signals, a mode changer for changing the voice output mode, and a control that prevents a voice output mode changing operation in response to a voice output mode changing signal provided by the mode changer, when the demodulator detects that the video signal and aural signal of the received signal are scrambled. When the video signal and aural signal of the received signal are scrambled, an indication of the voice output mode is suppressed and a special indication of the prevention of the change of voice output mode is displayed.

3 Claims, 4 Drawing Sheets

FIG. 3
FIG. 4
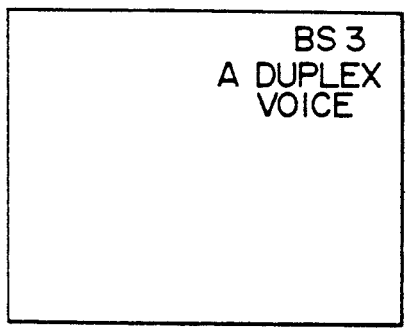

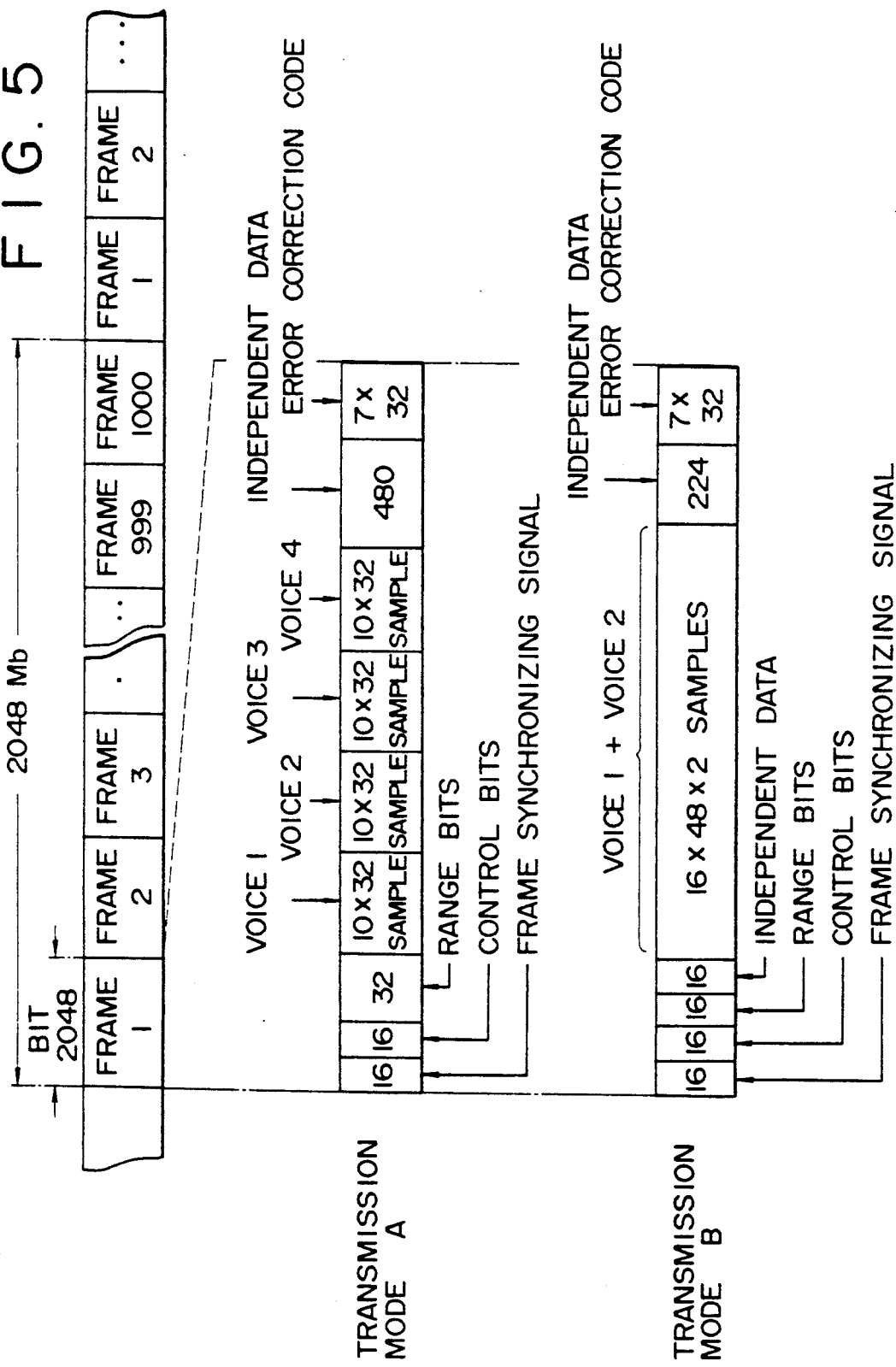

SATELLITE BROADCAST RECEIVER

BACKGROUND OF THE INVENTION

1. Field of the Invention

The present invention relates to circuitry adapted to be included in a satellite broadcast receiver.

2. Description of the Prior Art

Some satellite subscription television service systems scramble the video signals in a satellite broadcasting channel. The scrambled video signals cannot be displayed on the screen of the monitor unit of a satellite broadcast receiver if the scrambled video signals are fed directly to the monitor unit of the satellite broadcast receiver and, in general, aural (audio) signals are muted. The scrambled video signals received by the satellite broadcast receiver must be unscrambled by a scramble decoder to obtain unscrambled video signals, and then the unscrambled video signals (video signals and L-side aural signals and R-side aural signals) must be fed to the monitor unit. Thus, the satellite broadcast represented by scrambled video signals cannot be viewed and listened to by a satellite broadcast receiver not provided with any scramble decoder.

If a satellite broadcast is in a multivoice system, the viewer can optionally select the a main voice output mode, a subvoice output mode or a duplex voice output mode by operating a remote controller or a voice output mode selector key provided on the operating panel of the satellite broadcast receiver. For example, every time the voice output mode selector key is pressed, the main voice output mode, the subvoice output mode and the duplex voice output mode are selected sequentially and the selected voice output mode is displayed together with a channel number on the screen of the monitor unit as shown in FIG. 4.

The voice output mode of the received broadcast is identified by reading control bits (sixteen bits) subsequent to frame synchronizing signal bits in each frame of an aural signal as shown in FIG. 5. Usually, the first bit of the control bits is used for discriminating a transmission mode selected by a broadcast (an A mode or a B mode), the second and third bits identify the type of the aural signal (stereophonic aural signal, monophonic 2-channel aural signal (duplex voice system) or monophonic 1-channel aural signal) and the fourth and fifth bits identify the type of independent voice (stereophonic voice, monophonic 2-channel voice, monophonic 1-channel voice or a signal other than aural signals). The sixth bits and the following bits are used for extension.

Accordingly, the control unit of a BS tuner is able to identify the voice output mode of the received broadcast (an L+R mode, an L mode or an R mode for a stereophonic broadcast, or a main voice output mode, a subvoice output mode or a duplex voice output mode for a multivoice system) on the basis of the contents of voice identified by the control bit, and is able to execute switching control and display control.

A code representing a rule of compression and extension is written in range bits subsequent to the control bits in the aural signal construction shown in FIG. 5 and it is decided by reading the range bits if the received broadcast is scrambled.

Even if the video signal is scrambled so that the video signal cannot be displayed without unscrambling the scrambled video signal by a scramble decoder, the control bits, for instance, can be read out normally because only a voice data in the aural signal is scrambled. Accordingly, even if the scrambled broadcast has a plurality of voice output modes (a stereophonic broadcast or a multivoice broadcast), the broadcast can he neither viewed nor listened to because the satellite broadcast receiver is not provided with any scramble decoder and the voice output is muted, and the control unit controls the voice output mode on the basis of the data read from the control bits of the aural signal. That is, the voice output mode can optionally be selected by the viewer as stated above with reference to FIG. 4. However, the viewer is unable to discriminate the selected voice output mode.

For example, most satellite broadcast receivers have a last memory function for storing the last selected voice output mode, so that the subvoice output mode is selected in viewing a broadcast of a duplex voice output mode after the satellite broadcast receiver has been turned off after selecting the subvoice in the duplex voice output mode or when the channel is changed and a monaural broadcast is selected. If the voice output mode is changed without confirming the type of voice in receiving a scrambled broadcast by such a satellite broadcast receiver, it often occurs that a voice output mode not desired by the viewer is selected when a normal broadcast that is not scrambled is selected; consequently, the effect of the last memory function that enables the viewer to omit voice output mode selecting operation is nullified.

SUMMARY OF THE INVENTION

The present invention has been made in view of the foregoing problems and it is therefore an object of the present invention to provide a satellite broadcast receiver comprising demodulating means for demodulating received signals, operating means for changing the voice output mode, and control means that prevents a voice output mode changing operation to be executed in response to a voice output mode changing signal provided by the operating means, when the demodulating means detects that the video signal and aural signal of the received signal are scrambled. When the video signal and the aural signal are scrambled, the voice output mode of the received broadcast is not displayed.

If the change of the voice output mode is prevented when a scrambled broadcast cannot be viewed, the voice output mode is not changed without confirming actual voice, and the viewer can understand that the change of the voice output mode is prevented from a special indication different from ordinary voice output mode indications.

BRIEF DESCRIPTION OF THE DRAWINGS

The above and other objects, features and advantages of the present invention will become more apparent from the following description taken in connection with the accompanying drawings, in which:

FIG. I is a block diagram of a satellite broadcast receiver in a preferred embodiment according to the present invention;

FIG. 3 is a view of an example of an indication displayed on a screen;

FIG. 4 is a pictorial view of assistance in explaining indications corresponding to different voice output modes; and FIG. 5 is a view showing the construction of an aural signal.

DETAILED DESCRIPTION OF THE PREFERRED EMBODIMENT

Figure 1:
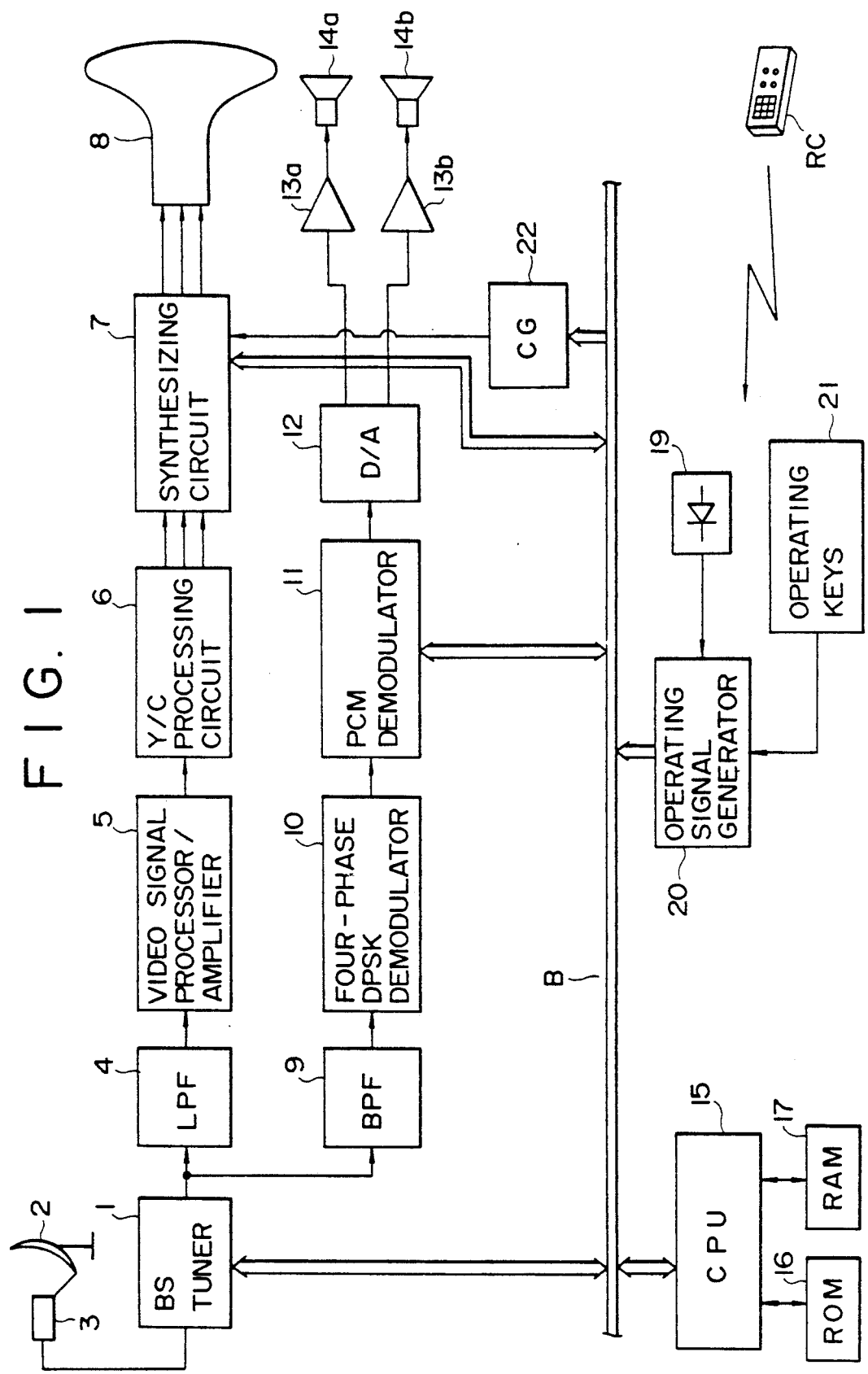

A satellite broadcast receiver with a built-in monitor unit in a preferred embodiment according to the present invention is shown in FIG. 1, in which components for receiving ordinary television broadcasts are omitted.

A signal received by a satellite broadcast antenna 2 is amplified and converted into a signal of a first intermediate frequency by a BS converter 3. A BS tuner 1 selects a channel, converts the signal of the first intermediate frequency into a signal of a second intermediate frequency, and demodulates the frequency to extract a frequency division multiplex video signal and a PCM sound subcarrier signal.

A 4.5 MHz low-pass filter 4 filters off the voice PCM subcarrier signal component (5.73±0.5 MHz) from the demodulated signal to extract the video signal component. The extracted video signal component is subjected to a de-emphasis process and an energy dispersal signal removing process in a video signal processor/amplifier 5 to obtain a composite video signal equivalent to an original signal before transmission.

A Y/C processing circuit 6 subjects the composite video signal to Y/C separation for color demodulation and the like, and demodulates R, G and B video signals by a matrix circuit. The demodulated R, G and b video signals are fed through a synthesizing circuit 7 to a CRT 8 to display an image on the CRT 8.

On the other hand, a 5.73 MHz band pass filter 9 extracts the voice PCM subcarrier signal from the demodulated signal. The extracted voice PCM subcarrier signal is demodulated by a four-phase DPSK demodulator 10 into a digital signal of PCM codes. The digital signal is subjected to a PCM demodulation process including error correction in a PCM demodulator 11 and the digital signal processed by the PCM demodulator 11 is converted into an analog aural signal by a D/A converter 12. The analog aural signal is applied to loudspeakers 14a and 14b after being amplified by amplifiers 13a and 13b.

A system controller (CPU) 15 controls through a control bus B the channel selecting operation of the BS tuner 1, the voice output mode changing operation of the PCM demodulator 11, and muting operation for scrambled broadcasts according to the operation of the operator and a control program. Control data and the control program are stored in a ROM 17 or a RAM 18. The system controller 15 reads data including control bits and range bits from the PCM demodulator 11 and determines the voice output mode of the signal to be demodulated and if the signal to be demodulated is a scrambled signal, on the basis of the data read from the PCM demodulator 11.

An infrared receiver 19 receives an infrared command signal transmitted by a remote controller RC, which is operated by the operator. An operating signal generator 20 converts the infrared command signal into an electric signal, amplifies the electric signal, converts the amplified electric signal into a digital signal and sends the digital signal through the control bus B to the system controller 15. Operating keys 21 arranged on an operating panel provided on a casing are operated to apply operating information to the system controller 15.

A character generator 22 is controlled by the system controller 15 to generate a character signal representing characters to be superposed on an image displayed on the screen of the CRT 8. The character signal generated by the character generator 22 is superposed on the video signal by high-speed switching means in the synthesizing circuit 7.

During the reception of a scrambled broadcast by the satellite broadcast receiver, the system controller 15 mutes the voice, prevents the manual switching of the voice output mode even if the broadcast is of a multi-voice system, and controls the character generator 22 to display an indication, for example, such as shown in FIG. 4, different from normal indications of voice output modes on the screen of the CRT 8.

Figure 2:
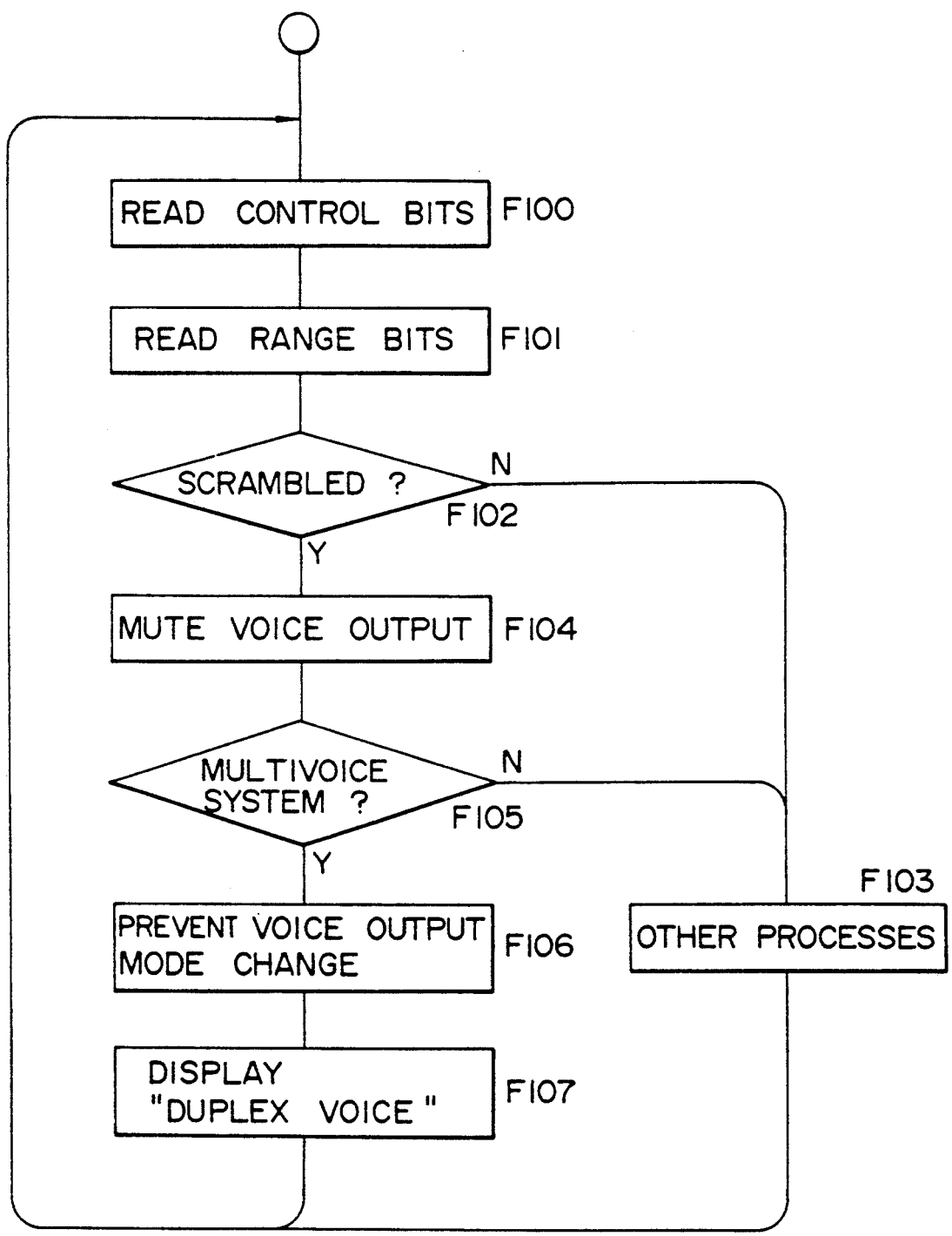
FIG. 2 is a flow chart of an example of control operation to be carried out by the satellite broadcast receiver of FIG. 1.

The operation of the system controller 15 will be described hereinafter with reference to FIG. 2.

In steps F100 and F101, the system controller 15 receives sequentially the data represented by the control bits and range bits read by the PCM demodulator 11, and then the system controller 15 determines in step F102 the type of the aural signal (stereophonic aural signal, duplex aural signal or monophonic aural signal) and if the received signal is scrambled. If the signal is not scrambled, the signal is processed normally. If the signal is scrambled, the system controller 15 gives a control signal to the PCM demodulator 11 in step F104 to mute the voice output If the received broadcast is a scrambled stereophonic broadcast or a scrambled duplex voice broadcast, namely, if the received broadcast has a plurality of voice output modes, the system controller 15 prevents the switching of the voice output mode in steps F105 and F106 even if a voice output mode changing signal is provided by the operating signal generator 20 so that the voice output mode cannot be changed by operating the remote controller RC or by operating the operating key 21. The system controller 15 gives a command signal to the character generator 22 in step F107 to display, for example, an indication "Duplex voice" as shown in FIG. 3, which is different from normal indications "Main", "Sub" and "Main/Sub".

The system controller 15 carries out the foregoing control procedure when a scrambled broadcast is received, so that it is possible to obviate the change of the voice output mode without the confirmation of the voice when the scrambled broadcast cannot be viewed on the CRT 8 and to inform the viewer of the prevention of the change of the present voice output mode by the special indication. The special indication is not limited to "Duplex voice", but may be a message such as "Scrambled and unviewable", "Voice change prevented", "Voice change forbidden".

Generally, the satellite broadcast receiver is provided with a detection output terminal and a digital control data output terminal (bit stream output terminal) to be connected to an external scramble decoder to connect the satellite broadcast receiver to an external scramble decoder. In receiving a scrambled broadcast, the satellite broadcast receiver gives control data and a detection signal to the scramble decoder connected thereto to unscramble the received scrambled broadcast, and the satellite broadcast receiver receives an unscrambled video signal including a video signal, an L aural signal and an R aural signal. The unscrambled broadcast can be displayed on the CRT 8 and the viewer is allowed to change the voice output mode.

Although the present invention has been described as applied to a satellite broadcast receiver with a built-in monitor, the present invention is applicable also to a satellite broadcast receiver not provided with any monitor.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A satellite broadcast receiver comprising:
    demodulating means, operating means, and control means;
    the demodulating means demodulating a received signal including a video signal and an aural signal and detecting if at least the video signal of the received signal is scrambled;
    the operating means changing the voice output mode; and
    the control means that preventing a voice output mode changing operation from being executed in response to a voice output mode changing signal provided by the operating means, when the demodulating means detects that the video signal of the received signal is scrambled.

2. A satellite broadcast receiver according to claim 1 wherein an indication of a voice output mode is suppressed when the demodulating means detects that the video signal of the received signal is scrambled.

3. A satellite broadcast receiver according to claim 2 wherein an indication of the prevention of a voice output mode changing operation is displayed.

* * * * *